United States Patent
McGinnis et al.

(10) Patent No.: US 12,098,329 B2
(45) Date of Patent: Sep. 24, 2024

(54) PROCESS FOR PURIFICATION AND CONVERSION OF CARBON DIOXIDE USING RENEWABLE ENERGY

(71) Applicant: Infinium Technology, LLC, Sacramento, CA (US)

(72) Inventors: Glenn McGinnis, Sun Lakes, AZ (US); Harold Wright, St. Joseph, MO (US); Matthew Caldwell, West Sacramento, CA (US); Orion Hanbury, Sacramento, CA (US); Alex Mattana, El Sobrante, CA (US); Robert Schuetzle, Sacramento, CA (US); Dennis Schuetzle, Grass Valley, CA (US); Anja Rumplecker Galloway, San Rafael, CA (US); James Bucher, Boston, MA (US)

(73) Assignee: Infinium Technology, LLC, Sacramento, CA (US)

( * ) Notice: Subject to any disclaimer, the term of this patent is extended or adjusted under 35 U.S.C. 154(b) by 0 days.

(21) Appl. No.: 17/803,266

(22) Filed: Apr. 11, 2022

(65) Prior Publication Data
US 2022/0333015 A1      Oct. 20, 2022

Related U.S. Application Data

(60) Provisional application No. 63/258,157, filed on Apr. 13, 2021.

(51) Int. Cl.
*C10G 2/00*      (2006.01)
*B01D 53/04*    (2006.01)
(Continued)

(52) U.S. Cl.
CPC ............... *C10G 2/50* (2013.01); *B01D 53/04* (2013.01); *B01D 53/1468* (2013.01); *C01B 3/06* (2013.01);
(Continued)

(58) Field of Classification Search
CPC ..... C01B 3/06; C01B 3/36; C01B 2203/0261; C01B 2203/0283; C01B 2203/062;
(Continued)

(56) References Cited

U.S. PATENT DOCUMENTS

| 8,198,338 B2 | 6/2012 | Shulenberger et al. |
| 2011/0219778 A1 | 9/2011 | Wijmans et al. |

(Continued)

FOREIGN PATENT DOCUMENTS

| KR | 10-2006-0116325 A | 11/2006 |
| WO | WO 2020/208008 A1 | 10/2020 |

OTHER PUBLICATIONS

Zang et al. "Life Cycle Analysis of Electrofuels: Fischer-Tropsch Fuel Production from Hydrogen and Corn Ethanol Byproduct CO2". Environmental Science & Technology 2021 55(6), 3888-3897.
(Continued)

*Primary Examiner* — Jafar F Parsa
(74) *Attorney, Agent, or Firm* — McKinney Law Group APC; Jeffrey A. McKinney

(57) ABSTRACT

The present invention is generally directed to processes and systems for the purification and conversion of $CO_2$ into low-carbon or zero-carbon high quality fuels and chemicals using renewable energy. In one aspect, the present invention provides a process for producing a stream comprising at least 90 mol % $CO_2$. In certain cases, the $CO_2$ stream is processed to make low carbon fuels and chemicals. In this process at least a portion of the $CO_2$ is reacted with a stream comprising $H_2$ in a Reverse Water Gas Shift (RWGS) reactor to produce a product stream that comprises CO.

17 Claims, 1 Drawing Sheet

(51) Int. Cl.
*B01D 53/14* (2006.01)
*C01B 3/06* (2006.01)
*C01B 3/36* (2006.01)
*C25B 1/04* (2021.01)

(52) U.S. Cl.
CPC .................. *C01B 3/36* (2013.01); *C25B 1/04* (2013.01); *B01D 2253/1124* (2013.01); *B01D 2256/22* (2013.01); *B01D 2257/102* (2013.01); *B01D 2257/30* (2013.01); *B01D 2257/406* (2013.01); *C01B 2203/0261* (2013.01); *C01B 2203/0283* (2013.01); *C01B 2203/062* (2013.01); *C01B 2203/065* (2013.01); *C01B 2203/1258* (2013.01); *C01B 2203/84* (2013.01); *C10G 2400/04* (2013.01); *C10G 2400/08* (2013.01)

(58) Field of Classification Search
CPC .............. C01B 2203/1258; C10G 2/50; C10G 2400/04; C10G 2400/08; C25B 1/04; B01D 2257/406; B01D 2257/30; B01D 2256/22; B01D 53/04; B01D 53/1468

See application file for complete search history.

(56) References Cited

U.S. PATENT DOCUMENTS

2012/0316252 A1    12/2012   Hodoshima et al.
2013/0137783 A1    5/2013    Kumar et al.

OTHER PUBLICATIONS

Stromberg "Combustion in a CO2/O2 mixture for a CO2 emission free", Second Nordic Minisyposium on Carbon Dioxide Capture and Storage. Goteborg Oct. 26, 2001.

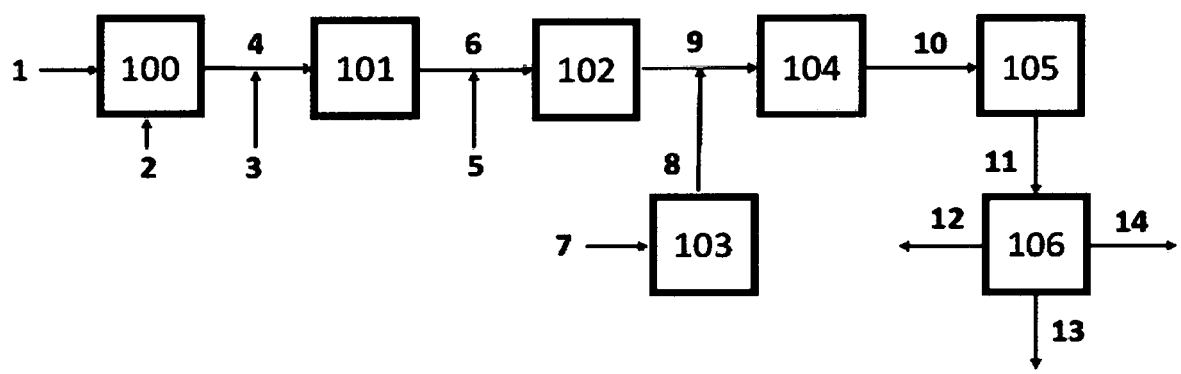

PROCESS FOR PURIFICATION AND CONVERSION OF CARBON DIOXIDE USING RENEWABLE ENERGY

This application claims the benefit of U.S. Provisional Patent Application No. 63/258,157, filed Apr. 13, 2021, which is incorporated by reference herein in its entirety.

FIELD OF THE INVENTION

The present invention is generally directed to processes and systems for the purification and conversion of $CO_2$ into low-carbon or zero-carbon high quality fuels and chemicals using renewable energy.

BACKGROUND OF THE INVENTION

Carbon dioxide ($CO_2$) is produced by many industrial processes and is usually discharged into the atmosphere. However, $CO_2$ has been identified as a significant greenhouse gas that contributes to warming the planet, so $CO_2$ emissions need to be reduced from these processes (e.g., petroleum refining, power production, steel manufacture, cement manufacture, ethanol production). Efforts are underway to develop versions of these processes that emit less $CO_2$ and/or capture and sequester the emitted $CO_2$ (e.g., in geologic formations). However, capturing the $CO_2$ and converting it into useful fuels and chemicals can yield better economic returns compared with simply sequestering the $CO_2$.

The $CO_2$ can be converted to fuels and chemicals with the aid of electrical power. Notably, this electrical power should be derived from renewable low-carbon resources (e.g., wind or solar) so as to not attenuate or even completely defeat the benefit of using $CO_2$ as a feedstock in the first place. However, industrial sources of $CO_2$ often have certain contaminants (e.g., hydrocarbons, oxygenated hydrocarbons, $SO_2$, $H_2S$, COS, $N_2$, amines) that prevent direct use of these feedstocks in electrochemical conversion processes. Removal of these contaminants with existing methods can have adverse economic impacts.

SUMMARY OF THE INVENTION

Described herein are systems and methods for economical removal of contaminants from industrial $CO_2$ sources. The systems and methods can take advantage of the synergistic benefit of having excess high purity oxygen ($O_2$) available from the electrolysis of water using renewable power. The hydrogen ($H_2$) from electrolysis can be combined with CO (e.g., generated from $CO_2$ in a Reverse Water Gas Shift (RWGS) reaction) to yield fuels and chemicals, while the $O_2$ can be used to remove contaminants from the $CO_2$ feedstock. Serendipitously, using the $O_2$ from electrolysis can avoid introducing nitrogen ($N_2$) into the system (i.e., if the $O_2$ were derived from air) and/or avoids the cost and energy input required to enrich $O_2$ from air.

In one aspect, a method for preparing a carbon dioxide stream for use in the production of renewable fuels and chemicals is provided. The method comprises: providing a contaminated $CO_2$ stream comprising $CO_2$ and contaminants, which comprise of hydrocarbons, oxygenated hydrocarbons, $SO_2$, $H_2S$, COS, $N_2$, amines, or combinations thereof; feeding the contaminated $CO_2$ stream to adsorbent beds to produce an outlet stream, wherein the outlet stream of the adsorbent beds has a concentration of $SO_2$, $H_2S$ and COS that is less than 20 parts per billion (ppb), and amine and ammonia concentrations of less than 100 ppb; mixing the adsorbent bed outlet stream with a stream comprising $O_2$ to produce a combustor feed stream; and feeding the combustor feed stream to a combustion reactor, where the contaminants are oxidized to produce a combustor product stream.

In another aspect, a method for producing a $CO_2$ stream comprising at least 90 mol % $CO_2$ is provided. The method comprises: providing a source stream comprising hydrocarbons, $CO_2$, and sulfur containing compounds; mixing the source stream with an $H_2$ stream derived from an electrolyzer to produce a low-temperature mixed source stream, wherein a mass ratio of the $H_2$ stream flowrate to the source stream flowrate is less than 10%; heating the low-temperature mixed source stream in a mixed stream heater that raises the temperature to produce a high-temperature mixed source stream having a temperature of at least 600° F.; feeding the high-temperature mixed source stream to a hydrodesulfurization reactor to produce a hydrodesulfurization product stream that comprises $CO_2$ and hydrogen sulfide; feeding the hydrodesulfurization product stream to a sulfur absorbent reactor to produce an absorbent product stream that comprises $CO_2$ and hydrocarbons, wherein less than ten percent by weight of the hydrogen sulfide that was in the hydrodesulfurization product stream remains in the absorbent product stream; mixing the sulfur absorbent product stream with an electrolyzer $O_2$ stream to produce a combustion feed stream; feeding the combustion feed stream to a combustion reactor to produce a combustion reactor product stream, wherein hydrocarbons in the combustion feed stream are at least partly combusted to $CO_2$ carbon dioxide and $H_2O$; mixing the combustion reactor product stream with a supplemental $H_2$ stream to produce an $O_2$ removal reactor feed stream; and feeding the oxygen removal reactor feed stream to an $O_2$ removal reactor to produce a purified carbon dioxide product stream.

In another aspect, a method for producing a renewable fuel or chemical is provided. The method comprises: providing a feed stream comprising $CO_2$ and hydrocarbon; using renewable power to electrolyze $H_2O$ and produce $H_2$ and $O_2$; converting the hydrocarbon in the feed stream to additional $CO_2$ using at least a portion of the $O_2$ from electrolysis; and converting the $CO_2$ and the $H_2$ into a renewable fuel or chemical.

In another aspect, a system for preparing a $CO_2$ stream for use in the production of renewable fuels and chemicals is provided. The system comprises: an adsorbent bed configured to convert a contaminated carbon dioxide stream into an outlet stream, wherein (i) the contaminated $CO_2$ stream comprises $CO_2$ and hydrocarbons, oxygenated hydrocarbons, $SO_2$, $H_2S$, COS, $N_2$, amines, or combinations thereof, and (ii) the outlet stream of the adsorbent beds has a concentration of $SO_2$, $H_2S$ and COS that is less than 20 parts per billion (ppb), and amine and ammonia concentrations of less than 100 ppb; an electrolyzer configured to electrolyze $H_2O$ to produce $H_2$ and $O_2$; and a combustion reactor configured to convert a mixture of the adsorbent bed outlet stream and the $O_2$ from the electrolyzer to a combustor product stream, wherein the contaminants are oxidized in the combustor product stream.

It should be appreciated that all combinations of the foregoing concepts and additional concepts discussed in greater detail below (provided such concepts are not mutually inconsistent) are contemplated as being part of the inventive subject matter disclosed herein. In particular, all combinations of subject matter within this disclosure are contemplated as being part of the inventive subject matter disclosed herein.

Still other aspects, examples, and advantages of these exemplary aspects and examples, are discussed in detail below. Moreover, it is to be understood that both the foregoing information and the following detailed description are merely illustrative examples of various aspects and examples, and are intended to provide an overview or framework for understanding the nature and character of the claimed aspects and examples. Any example disclosed herein may be combined with any other example in any manner consistent with at least one of the objects, aims, and needs disclosed herein, and references to "an example," "some examples," "an alternate example," "various examples," "one example," "at least one example," "this and other examples" or the like are not necessarily mutually exclusive and are intended to indicate that a particular feature, structure, or characteristic described in connection with the example may be included in at least one example. The appearances of such terms herein are not necessarily all referring to the same example.

BRIEF DESCRIPTION OF THE DRAWINGS

FIG. 1 shows an example of a schematic diagram for a process to purify a $CO_2$ source stream comprising $CO_2$ that contains contaminants (e.g., inorganic sulfur and nitrogen compounds, amines, hydrocarbons, and oxygenated hydrocarbons).

DETAILED DESCRIPTION OF THE INVENTION

The present invention describes processes and systems for the purification and conversion of $CO_2$ into low-carbon or zero-carbon high quality fuels and chemicals using renewable energy.

$CO_2$ can be converted into useful products such as fuels (e.g., diesel fuel, gasoline blend stocks, and jet fuel) and chemicals (e.g., solvents, olefins, alcohols, aromatics, and others) using renewable energy. As a result, these low-carbon products can displace fuels and chemicals produced from petroleum and natural gas, lowering the total net emissions of $CO_2$ into the atmosphere. As used herein, the term "low-carbon" fuels or chemicals means that the carbon intensity is at least 20% (but more preferably at least 50% or more) lower than the same fuels or chemicals produced from fossil sources calculated using carbon intensity calculators such as the Argonne National Laboratory GREET model, or other life cycle assessment tools. The term low-carbon electricity means that electricity is produced from any non-fossil source such as solar, wind, biomass, and nuclear power production plants. $CO_2$ can be obtained from various manufacturing plants used to produce power, cement, steel, petroleum-based fuels and chemicals, ammonia, ethanol, and commodity products such as batteries. In addition, municipal sewage treatment systems that use aerobic and anaerobic digestion of sludge produce large amounts of $CO_2$. $CO_2$ can also be captured from the atmosphere using a process called direct air capture (DAC).

Low-carbon or zero-carbon fuels and chemicals are often called e-fuels or e-chemicals because they require hydrogen produced by electrolysis of water. In an electrolyzer, electricity and heat are used to separate water into hydrogen and oxygen.

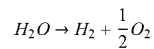

$$H_2O \rightarrow H_2 + \frac{1}{2}O_2$$

Electrolyzers can have an anode and a cathode separated by an electrolyte. Different electrolyzer designs function in slightly different ways. Electrolysis technologies which can be used to produce $H_2$ and $O_2$ include alkaline electrolysis, proton exchange membrane (PEM), and solid oxide electrolysis. Different electrolytes can be used including aqueous KOH and NaOH, with or without activating compounds. Activating compounds can be added to the electrolyte to improve the stability of the electrolyte. Most ionic activators for the hydrogen evolution reaction comprise an ethylenediamine-based metal chloride complex (e.g., $[M(en)_3]Clx$, $M¼Co, Ni$) and $Na_2MoO_4$ or $Na_2WO_4$. Different electrocatalysts can be used on the electrodes including many different combinations of metals and oxides, such as Raney-Nickel-Aluminum, which can be enhanced by adding cobalt or molybdenum to the alloy.

Several combinations of transition metals, such as $Pt_2Mo$, $Hf_2Fe$, and TiPt, have been used as cathode materials and have shown significantly higher electrocatalytic activity.

In solid oxide electrolyzers, water at the cathode combines with electrons from the external circuit to form $H_2$ gas and negatively charged $O_2$ ions. The $O_2$ ions pass through the solid ceramic membrane and react at the anode to form $O_2$ gas and generate electrons for the external circuit. In this way, both $H_2$ hydrogen and $O_2$ gases are produced in the electrolyzer. In some embodiments, multiple electrolyzers are operated in parallel.

The electrolyzer produces at least two product streams, an electrolyzer hydrogen comprising hydrogen, and an electrolyzer oxygen stream comprising oxygen. There are other ways to generate low carbon hydrogen streams including production of "turquoise $H_2$" from the pyrolysis of natural gas/methane, production of "blue $H_2$" using steam methane reforming (SMR) or autothermal reforming (ATR) to produce $H_2$ where the $CO_2$ emissions are captured from the flue gas stack.

Utilization of $CO_2$, as described herein, typically involves separating and purifying the $CO_2$ from a gaseous mixed stream where the $CO_2$ is not the major component. Typically, an alkylamine or chilled methanol is used to remove the $CO_2$ from the gas stream in a direct-contact process where the $CO_2$ is preferentially adsorbed into the contacting liquid. Alkylamines used in the process can include monoethanolamine, diethanolamine, methydiethanolamine, disopropyl-amine, aminoethoxyethanol, and other compounds and mixtures. Equipment corrosion due to the usage of alkanolamines for $CO_2$ absorption can be a significant problem. The corrosion rate tends reduce in the following order: monoethanolamine (MEA)>2-amino-2-methyl-1-propanol (AMP)>diethanolamine (DEA)>methyl diethanolamine (MDEA). However, MDEA has higher $CO_2$ absorption capacity and requires lower energy to regenerate CO.

Compared to amines, adsorption can reduce energy and cost of the capture or separation of $CO_2$. To achieve this goal, adsorbents with suitable properties can be used. Metal Organic Framework (MOF) materials have can be used as a means of separating carbon dioxide from a dilute stream using chemisorption or physisorption to capture the $CO_2$ from the stream. Other methods to get concentrated $CO_2$ include chemical looping combustion where a circulating metal oxide material provides the oxygen for combustion of a carbonaceous material, in place of air, thus creating an exhaust undiluted with nitrogen and so concentrated in $CO_2$. Chemisorption is a subclass of adsorption where separation is driven by a chemical reaction between the sorbent and $CO_2$. Materials that can be used for the separation of $CO_2$ include but are not limited to MgO, CaO, $Li_2ZrO_3$, and hydrotalcites.

Membrane separation method is a continuous, steady-state, simple process for $CO_2$ separation. The process is relatively conservative in its energy needs. Yet, the driving force for separation can be low in low pressure applications. Furthermore, cryogenic distillation can be used to separate $CO_2$ from other streams and enables the production of liquid $CO_2$ and also its storage and transport.

$CO_2$ capture and compression can separate $CO_2$ from flue gas of oxy-fuel combustion. In some cases, cryogenic separation can be cost effective when the feed gas is available at high pressure.

$CO_2$ captured from industrial sources or ambient air may contain a wide array of impurities, which can adversely impact the downstream process. The nature of the impurities strongly depends on the $CO_2$ source and nature of the technology used to capture the $CO_2$. While some $CO_2$ sources are extremely pure, others may include sulfur impurities such as $SO_2$, $H_2S$, COS, elemental sulfur, and heavier organosulfur species. Organo-sulfur species can include mercaptanes, sulfides, disulfides and aromatic sulfur species. Sulfides and disulfides may also be aromatic. Thiophenes are polynuclear organic sulfur species, and are usually present in conjunction with heavier hydrocarbons. Hydrocarbon impurities in $CO_2$ are common, and include methane, ethane, more reactive olefines or alkynes, which can cause coke formation in conversion processes. Heavier hydrocarbons are commonly present in waste gas streams from petroleum refinery operations.

Other impurities in $CO_2$ such as $N_2$, $NO_x$, $O_2$ and Ar originate from air used in upstream processes. Additional impurities may include materials used for the $CO_2$ separation process, such as monoethanolamine (e.g., in the case of post-combustion capture) or Selexol™ (e.g., in pre-combustion capture), and their degradation products can also be carried over into the $CO_2$ stream.

Purification of $CO_2$, including the removal of sulfur containing compounds and hydrocarbons, can be necessary to avoid issues with downstream processing. The purified $CO_2$ produced using the methods described herein is suitable for the generation of low carbon or zero-carbon fuels and chemicals.

Hydrodesulfurization (HDS) is the method most commonly applied to remove sulfur and sulfur species from natural gas and refined products. The feed is combined with hydrogen gas, heated to 300-400° C. in a heat-exchanger, or gas fired heater. The feed is then fed into a fixed-bed reactor at 10 to 130 atmospheres of absolute pressure. HDS is typically performed in the presence of a catalyst consisting of either cobalt/molybdenum or nickel/molybdenum (so called "CoMo" or "NiMo" catalyst, respectively) and may also contain related catalysts of different formulations. This process hydrogenates the sulfur containing compounds and produces hydrogen sulfide ($H_2S$). The resulting stream is then either passed through a zinc oxide (ZnO) bed to absorb sulfur to form zinc sulfide (ZnS) or is cooled through heat exchangers and fed into an amine column for $H_2S$ removal. $H_2S$ is usually recovered from the amine gas and subsequently converted to sulfuric acid or elemental sulfur (Claus Process). At the same time, all nitrogen containing impurities in the feed stream are converted to $NH_3$. One of the key disadvantages of HDS is that sulfur species may not be removed completely. The reactivity of heterocyclic sulfur compounds decreases in the order of thiophene, alkylated thiophenes, benzothiophene, alkylated benzothiophenes, dibenzothiophene, and dimethyldibenzothiophene. In those cases, additional desulfurization measures are required to accomplish deep desulfurization. Also, depending on the nature of the feedstock HDS can require large amounts of valuable $H_2$.

Thermal oxidizers can be used to remove pollutants from industrial waste streams. The technology can remove hazardous air pollutants, volatile organic compounds (VOC), and odorous emissions from waste streams that would otherwise be discharged into the atmosphere. Thermal oxidizers may be catalytic or non-catalytic. Hydrocarbons are oxidized to form $CO_2$ and $H_2O$.

The efficacy of thermal oxidizers or combustion systems in general is affected by the fuel to oxygen ratio, temperature, residence time, and turbulence. Combustion of a hydrocarbon can be described by the exothermic reaction:

$$C_xH_yO_z+[x+y/4-z/2]O_2 \rightarrow xCO_2+y/2H_2O$$

The equivalence ratio is defined as the ratio of the actual fuel/oxygen ratio to the stoichiometric fuel/oxygen ratio, and can be a useful term in understanding combustion. Stoichiometric combustion occurs when all the oxygen is consumed in the reaction (i.e., and there is no molecular oxygen ($O_2$) in the product).

Other components in the combustor feed gas such as nitrogen or sulfur containing components can lead to the formation of $SO_x$ and $NO_x$ which pose serious environmental concerns and need to be removed prior to emitting the waste stream to the environment. While abatement systems are available, emissions of nitrogen oxides ($NO_x$) from combustion systems continue to be an environmental issue. These species can be greenhouse gases and/or acid rain precursors. The routes leading to the formation of $NO_x$ in combustion systems mostly involve the insertion of radicals such as O, $CH_x$, and H, into the triple bond of molecular nitrogen in combustion air.

$SO_2$ can be removed by adding limestone ($CaCO_3$) or dolomite ($CaMg(CO_3)_2$) directly to the convective pass with high temperature filtration. The reaction of $CaCO_3$ may involve various reaction steps, such as:

$$CaCO_3+SO_2 \rightarrow CaSO_3+CO_2$$

$$CaSO_3+\tfrac{1}{2}O_2 \rightarrow CaSO_4$$

$$CaCO_3+\tfrac{1}{2}SO_2 \rightarrow CaSO_4+\tfrac{1}{2}S_2$$

$CaSO_3$ decomposes at temperatures higher than 650° C., and therefore, the overall reaction may be written as:

$$CaCO_3+\tfrac{1}{2}SO_2+\tfrac{1}{2}O_2 \rightarrow CaSO_4+CO_2$$

The combustion of waste gases may also be accomplished in a catalytic oxidizer. Here, a catalyst is used to increase the rate of the combustion reaction and less fuel may be required to preheat the waste gas.

Moderate and intense low-oxygen dilution (MILD) combustion technologies can reduce the environmental concerns linked to the use of both conventional and alternative fuels. MILD combustion, also referred to as flameless or high-temperature air combustion (HiTAC), can limit the emissions of pollutants like carbon monoxide (CO), nitrogen oxides ($NO_x$) and soot. These processes provide elevated combustion efficiency and fuel flexibility.

Most combustion processes use air as the oxidizer. Air contains approximately 21% $O_2$ and 79% $N_2$ by volume. Using $O_2$-enhanced combustion can greatly improve productivity and thermal efficiency with lower exhaust gas volume and pollutant emissions. The application of thermal or catalytic oxy-combustion for the purification is typically impacted by the cost and availability of oxygen. However, in the systems and methods described herein, $O_2$ for thermal or catalytic oxy-combustion can be supplied by electrolysis and/or a cryogenic air separation unit (ASU). Oxygen can also be produced and supplied by the electrolysis of water.

The ASU technology uses cryogenic fractional distillation, where the components are separated by compressing the gas until it liquefies and then selectively distilled to their boiling points. As this is very costly and energy-intensive, the ASU technology is usually only applied for large scale productions.

Replacing air with pure $O_2$ can significantly increase the performance of a combustion system. $O_2$-enhanced combustion can be used in many different applications, including fluid catalytic cracking, metal processing, sulfur recovery, waste incineration, biofuels, pet-coke, and solid fuels, as well as oxy-coal combustion with $CO_2$ capture. The combustion process in the thermal oxidizer can be optimized for combustion performance, heat transfer, impurities, and minimization of energy penalty caused by the used by the air separation unit (ASU).

Described herein are systems and methods for the purification of streams comprising $CO_2$ and the use of that stream to produce low-carbon or zero-carbon fuels, in particular the removal of any combustible impurities. The $CO_2$ stream can be captured from industrial processes or is available from an industrial pipeline, and may also come from other $CO_2$ sources such as direct air capture. Provided herein is a process for producing a stream comprising at least 90 mol % $CO_2$ (e.g., between 90 mol % $CO_2$ and 95 mol % $CO_2$, or between 90 mol % $CO_2$ and 100 mol % $CO_2$). The process can comprise multiple steps, e.g., in sequence.

A source stream can comprise at least 50 mol % $CO_2$ with contaminants comprising hydrocarbons, $CO_2$, organic sulfur containing compounds, $SO_2$, $H_2S$, COS, $N_2$, amines, polar organic compounds, or combinations thereof. The source stream can be pre-heated and fed into an oxy-combustion reactor. The source stream can be mixed with an electrolyzer oxygen stream to produce a combustor reactor feed stream. The electrolyzer $O_2$ stream can comprise $O_2$ that has been produced from the electrolysis of water in an electrolyzer. The combustor feed stream can be fed to a combustor reactor where the hydrocarbons in the combustor feed stream are combusted to $CO_2$ and water to produce a combustion reactor product stream.

The combustor system can include a combustion chamber in which the combustible components in the $CO_2$ are oxidized. Depending on the composition of the original $CO_2$ feed, additional CO and $CO_2$ from hydrocarbon impurities can be generated, as well as $SO_2$ from organic sulfur compounds (if present). The inlet temperature in the combustor can be determined by the feedstock composition, and its ability to manage coke. The temperature may be as low as room temperature or up to about 400° C. The heating can be accomplished using electric heaters. In some cases, the electricity used in the electric heaters is derived from a low-carbon process. If available heating may also be accomplished by integrating downstream waste-heat.

The reaction temperature depends on the heating value of the hydrocarbons in the feed stream. The heating value of the composition can depend on the type and the amounts of impurities. The energy released by the combustion of the total organics (e.g., volatile organic compounds (VOCs) we well as other hydrocarbons/organics) in the waste gas stream may not be sufficient to raise its own temperature to the desired levels. If required, auxiliary fuel may be added to raise the temperature in order to support a flame in the combustor. Auxiliary fuel may be hydrogen, methane or other hydrocarbons. In order to minimize carbon intensity of the process, natural gas can be avoided, and low-carbon intensity hydrogen can be used.

$SO_2$ can be removed by adding limestone ($CaCO_3$) or dolomite ($CaMg(CO_3)_2$) directly to the combustor. $CaSO_3$ can decompose at temperatures higher than 650° C., and therefore, under typical operating conditions in the unit, the overall reaction may be written as:

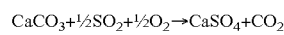

$$CaCO_3 + \tfrac{1}{2}SO_2 + \tfrac{1}{2}O_2 \rightarrow CaSO_4 + CO_2$$

At high sulfur content, additional metal sorbents such as ZnO may be used. Other metal oxides that may be used are based on Fe, Cu, Mn, Mo, Co, and V.

As an alternative to limestone or dolomite addition, one can remove the organic sulfur and hydrogen sulfide upstream prior to the combustion reactor (e.g., by catalytic hydrodesulfurization) to convert the organic sulfur to hydrogen sulfide. An adsorbent bed of a material such as zinc oxide to capture the hydrogen sulfide can then be used.

The combustion reactor product stream can be free of hydrocarbons and $SO_2$ and comprise $CO_2$, CO, $H_2O$, and excess $O_2$. This stream can now be mixed with a supplemental $H_2$ stream to produce an $O_2$ removal reactor feed stream.

The $O_2$ removal reactor feed stream can be fed to an $O_2$ removal reactor to combust the excess $O_2$ to produce $H_2O$, thereby producing a product stream of purified $CO_2$ and $H_2O$. The $H_2O$ can be removed by cooling the product stream to condense the $H_2O$ separate the liquid $H_2O$ from the purified $CO_2$. The dry, purified $CO_2$ product stream can have a composition of at least about 90 wt. % $CO_2$ (e.g., between 90 wt. % and 95 wt. % $CO_2$ or between 90 wt. % and 100 wt. % $CO_2$) in the source stream. In some cases, the $CO_2$ product stream has less than 50 parts per billion (ppb), or less than 20 ppb of the sulfur containing compounds. In some cases, the $CO_2$ product stream has less than 2,000 ppb, or less than 500 ppb hydrocarbons (e.g., which hydrocarbons were in the source stream).

Furthermore, the purified $CO_2$ stream can be used to produce low-carbon, or zero-carbon fuels and chemicals. The conversion process can involve conversion of $CO_2$, $H_2O$, and electricity to chemicals and fuels. The process can involve the electrolysis of water into $H_2$ and $O_2$ using renewable and/or low carbon electricity. Low carbon electricity can be electricity that is produced from wind, solar, nuclear, biomass, or other non-fossil sources. $CO_2$ can be collected using a $CO_2$ capture process, as described herein. $CO_2$ can be reacted with excess $H_2$ to produce CO and water using the reverse water-gas shift (RWGS) (often referred to as $CO_2$ hydrogenation) reaction where the heat of reaction is provided by a RWGS heater. The RWGS reaction can take place in a RWGS reactor in which there is a RWGS catalyst. The RWGS catalyst can be a solid solution catalyst comprising a transition metal such as nickel which is impregnated on a suitable high-surface area substrate. The RWGS product stream, comprising CO and $H_2$, can be converted to fuels and chemicals in a liquid fuels production (LFP) reactor that uses a catalyst to produce long chain hydrocarbons that can be used as fuels and chemicals. The final product can be a hydrocarbon mixture where the majority (e.g., 60 to 99 vol. %) of hydrocarbons in the mixture are hydrocarbons of 5 to 24 carbon atoms in length.

Turning attention to the figures, FIG. 1 shows a schematic diagram for a process to purify a stream comprising $CO_2$ that can contain inorganic sulfur and nitrogen compounds, amines, hydrocarbons, and oxygenated hydrocarbons. The purified $CO_2$ stream of the process is stream 6. The purified $CO_2$ stream is blended with $H_2$, heated separately or combined, and catalytically converted to syngas in reactor 104. The syngas stream 10 is catalytically converted to fuels and chemicals.

Stream 1 is the contaminated $CO_2$ source stream. The pressure of this stream can typically be in the range of 25 pounds per square inch gauge (psig) to 500 psig. The temperature of stream 1 can be ambient or near ambient. Unit 100 can contain adsorbents that remove the particulates, polar inorganic sulfur, and nitrogen compounds.

The reactor 101 may be thermal (non-catalytic) if the concentration of the hydrocarbons is greater than about 3 vol. %, or catalytic if the hydrocarbon concentration is less than about 3 vol. %.

An $O_2$ stream 3 can be added at various flow rates, the flow rate being dependent upon the $O_2$ to hydrocarbon fuel ratio in the thermal reactor 101. The $O_2$ can be produced by the electrolysis of $H_2O$ using low carbon electricity. Additional hydrocarbons or methane may be added in a separate stream 4 in order to optimize the combustion in the thermal reactor 101. Adding additional components in stream 4 may be utilized in a thermal combustion if stream 1 contains less than 3 vol. % hydrocarbons. An $O_2$ to fuel ratio sensor can be used to control the combustion process in thermal reactor 101 at or just below stoichiometry. The flow of the oxygen stream 3 can be controlled to keep the combustion of the hydrocarbons and oxygenated hydrocarbons at or just below stoichiometry (e.g., 0.95-1.00). In some cases, a small excess $O_2$ is acceptable, it can (nearly instantly) react with $H_2$ and not make it into the RWGS reactor. In reactor 101, the $O_2$ and the hydrocarbons in stream 4 can react to primarily form $CO_2$ and $H_2O$, with a minor concentration of CO. $H_2S$ and any other sulfur containing species can be converted to SOx. The concentration of $O_2$ in stream 6 can be controlled to less than about 500 ppm. Hydrated lime can be fluidized directly in reactor 101.

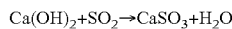

$$Ca(OH)_2 + SO_2 \rightarrow CaSO_3 + H_2O$$

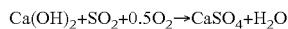

$$Ca(OH)_2 + SO_2 + 0.5 O_2 \rightarrow CaSO_4 + H_2O$$

Lime wash can remove over 95% of SOx, as well as over 99% of HCl or HF. Transformed into calcium sulfite, calcium sulfate, calcium chloride, and calcium fluoride, the acidic gases can be captured (e.g., on bag filters) as solids. The excess hydrated lime can be re-circulated to improve lime utilization. Above 850° C., $Ca(OH)_2$ forms CaO, which in the presence of oxygen, quickly reacts to form calcium sulphate below 1200° C.

Additional high-purity $CO_2$ may be added as available (Stream 5) and the blended stream 6 can be fed to Unit 102, which heats the purified $CO_2$ stream 6 up to temperatures as high as 1,750° F. Renewable energy can be used to heat the unit 102.

An $H_2$ stream 7 can be heated in Unit 103 to a temperature as high as 1,750° F. and added to the heated stream 9, as desired, to produce a molar $H_2/CO_2$ ratio that is between 1.5 and 4.0. Unit 103 can be heated using low-carbon or zero-carbon fuel gas such as tail gas from a catalytic reactor 107. Unit 103 can also be a resistance or induction heater that can be operated with low carbon electricity.

As a result of the systems and methods described herein, stream 9 can contain less than 20 ppb of $SO_2$, $H_2S$ and COS; have amine and ammonia concentrations of less than 100 ppb; have less than 500 ppm of $O_2$; and the hydrocarbons and oxygenated hydrocarbons in the contaminant $CO_2$ stream can be reduced by more than 95%.

The heated stream 9 can be feed into a catalytic reverse water gas shift (RWGS) reactor 104. The catalytic RWGS reactor vessel can be adiabatic or nearly adiabatic and designed to minimize heat loss. In some embodiments, no heat is added to the main reactor vessel in the adiabatic mode and the temperature in the main reactor vessel can decline from the inlet to the outlet of the reactor.

The RWGS reactor 104 can be a cylindrical vessel (e.g., with a length longer than diameter). The entrance to the reactor vessel can be smaller than the overall diameter of the vessel. The reactor vessel can be a steel vessel that is lined with an inert material that is non-reactive with the heated syngas. The steel vessel can be insulated to limit heat loss. Various types of insulation include poured or castable refractory lining or insulating bricks may be used to limit the heat losses to the environment. The reactor shell can comprise metallurgy for a cold wall vessel with a maximum external surface temperature of less than 400° F. (e.g., between 200° F. and 400° F.).

A bed of catalyst can be inside the reactor vessel 104. The catalyst can be in the form of granules, pellets, spheres, trilobes, quadra-lobes, monoliths, or any other engineered shape (e.g., to minimize pressure drop across the reactor). The shape and particle size of the catalyst particles can be managed such that pressure drop across the reactor is less than 50 pounds per square inch (psi) (e.g., between 10 psi and 50 psi), and in some cases, less than 20 psi (e.g., between 10 psi and 20 psi). The size of the catalyst form can have a characteristic dimension of between 1 mm to 10 mm. The catalyst particle can be a porous material with an internal surface area greater than 10 $m^2/g$ (e.g., between 10 $m^2/g$ and 50 $m^2/g$), in some cases greater than 50 $m^2/g$ (e.g., between 50 $m^2/g$ and 100 $m^2/g$). The packed catalyst can be arranged as a down-flow, supported on ceramic balls. Radial flow can also be used. In some cases, the catalyst bed minimizes pressure drop (above that needed for flow distribution) at the desired high gas hourly space velocity (GHSV) design. In some embodiments, the dimensions of 4 feet inner diameter by 4 feet deep bed of catalyst gives a GHSV of approximately 26,000 $h^{-1}$ with a pressure drop through the support balls and catalyst of 6 psi (0.21 bar). Several catalyst materials can catalyze the RWGS reaction. In some cases, the RWGS catalyst is a solid solution catalyst that primarily comprises $Ni_2Mg$ impregnated on a high-temperature spinel. This high-performance, solid-solution, Ni-based catalyst can be highly versatile and perform the RWGS reaction efficiently. The catalyst can have high thermal stability up to 1,100° C. (e.g., between 900° C. and 1,100° C.), does not form carbon (coking), and has good resistance to contaminants that may be present in captured $CO_2$ streams. This catalyst exhibits high activity at low $Ni_2Mg$ concentrations (<5.0 wt. %). In some cases, the use of expensive precious metals to enhance catalyst performance is not necessary.

The RWGS reactor product gas is stream 10, which comprises CO, $H_2$, unreacted $CO_2$, $H_2O$, and a small amount of $CH_4$ (produced by a methanation reaction). The RWGS reactor product gas can be used in several ways. The product gas can be cooled, compressed, and used in downstream processes to produce fuels and chemicals. The RWGS product gas can also be cooled, compressed, and sent back to the heated chamber 102 and the RWGS reactor vessel 104. The RWGS product gas can also be reheated in a second heated chamber and sent to a second RWGS reactor vessel where additional conversion of $CO_2$ to CO can occur. The second RWGS reactor product gas can also be reheated in a third heated chamber and sent to a third RWGS reactor vessel where additional conversion of $CO_2$ to CO can occur.

At least a portion of the RWGS reactor product stream 10 can be fed to a liquid fuel production (LFP) catalytic reactor (Unit 105). Stream 10 can be compressed before input into Unit 105 (i.e., such that the operating pressure of the syngas stream 10 is not too low).

The catalytic reactor 105 can convert CO and $H_2$ (that are in stream 10) primarily into $C_1$-$C_{24}$ hydrocarbons that can be used as liquid fuels and chemicals. Stream 11 can be fed to a separation system, Unit 106. This separation system 106 separates the products from Unit 105 into tail gas ($C_1$-$C_5$ hydrocarbons and unconverted CO and $H_2$) (stream 12), liquid phase products ($C_5$-$C_{24}$ hydrocarbons and oxygenated hydrocarbons) (stream 13), and a small fraction (typically less than 5 volume %) of $C_{24+}$ hydrocarbons (stream 14).

The catalytic reactor 105 can use a catalyst for production of liquid fuel range hydrocarbons from syngas. In some cases, the hydrogen to carbon monoxide ratio in the stream is between 1.9 and 2.2 (v/v), but it can be varied between 1.0 and 3.0 (v/v) to modify the product distribution. The LFP reactor can be a multi-tubular fixed-bed reactor system. Each LFP reactor tube can be between 13 mm and 51 mm in diameter. The length of the reactor tube is generally greater than 6 meters in length (e.g., between 6 meters and 15 meters) and in some cases greater than 10 meters in length (e.g., between 10 meters and 15 meters). Most of the length of the LFP reactor tube can be filled with LFP catalyst. The LFP catalyst may also be blended with diluent such as silica or alumina to aid in the distribution of the LFP reactor feed into and through the LFP reactor tube. The chemical reaction that takes place in the LFP reactor produces an LFP product gas that comprises most hydrocarbon products from five to twenty-four carbons in length ($C_5$-$C_{24}$ hydrocarbons) as well as water, although some hydrocarbons are outside this range.

In some embodiments, unit 100 may include HDS following particulate removal. $H_2$ may be added as stream 2 as excess $H_2$ available from the electrolyzer. The HDS reactor can be a pressure vessel containing hydrodesulfurization catalyst. Here, the sulfur containing compounds are converted to $H_2S$. The hydrodesulfurization catalyst can comprise Co and Mo or Ni and Mo, or combinations thereof. The HDS reactor product comprises carbon dioxide, hydrocarbons, excess $H_2$, and $H_2S$. The HDS reactor product stream can be fed to the sulfur adsorbent reactor. The sulfur adsorbent reactor can be filled with an $H_2S$ adsorbent such as ZnO that reacts with the $H_2S$ and removes it from the stream. Multiple sulfur adsorbent reactors may be present in series or in parallel or in a lead-lag configuration such that when the adsorbent is saturated with $H_2S$ and sulfur breaks through in the stream, the reactor with the used adsorbent can be removed from service and the adsorbent replaced without reducing the overall ability of the process to remove the $H_2S$. In some cases, some hydrogen is present. Any hydrocarbon impurities that were in the source stream (stream 1) may still be present in their saturated form.

In some embodiments, purification of the $CO_2$ may include particulate removal, HDS, as well as oxycombustion. In particular, when high levels of impurities were present in stream 1. In these scenario, the temperature rise generated in unit 101 may minimize the heating requirements in unit 102.

In some embodiments, the LFP catalyst comprises cobalt as the active metal. In some cases, the LFP catalyst comprises iron as the active metal. In some embodiments, the LFP catalyst comprises combinations of iron and cobalt as the active metal. The LFP catalyst can be supported on a metal oxide support that can be chosen from a group consisting of alumina, silica, titania, activated carbon, carbon nanotubes, zeolites or other support materials. The LFP catalyst can have sufficient size, shape, pore diameter, surface area, crush strength, and effective pellet radius. The catalyst can have various shapes including lobed supports with either three, four, five, or more lobes (e.g., with two or more of the lobes being longer than the other two shorter lobes, with both the longer lobes being symmetric). The distance from the mid-point of the support or the mid-point of each lobe is called the effective pellet radius which can contribute to the desired selectivity of $C_5$ to $C_{24}$ hydrocarbons.

The LFP reactor can be operated at pressures between 150 to 450 psi. The reactor is operated over a temperature range from 350° F. to 460° F. and more typically at around 410° F. (e.g., between 400° F. and 420° F.). The LFP or Fischer-Tropsch (F-T) reaction is exothermic. The temperature of the reactor can be maintained inside the LFP reactor tubes by the reactor tube bundle being placed into a heat exchanger where boiling water is present on the outside of the LFP reactor tubes. The boiler water temperature is at a lower temperature than the LFP reaction temperature so that heat flows from the LFP reactor tube to the lower temperature water. The shell water temperature can be maintained by controlling the pressure of the produced steam. The steam can be saturated steam. In some embodiments, the catalytic LFP reactor can be a slurry reactor, microchannel reactor, fluidized bed reactor, or other reactor type.

The CO conversion in the LFP catalytic reactor 105 can be maintained at between 40 to 60 mole % CO conversion per pass. The desired liquid hydrocarbon product can be separated from the stream by condensation or any other acceptable means 106. The LFP tail gas comprises the unreacted CO, $H_2$ and $C_1$-$C_5$ hydrocarbons and is shown as stream 12.

The reactor product that contains the desired $C_5$-$C_{24}$ hydrocarbons can be further processed in a separation system. The separation system can include fractionation or distillation.

The desired $C_5$-$C_{24}$ products can be used for gasoline blend-stock, diesel fuel, jet fuel, or used as low-carbon chemicals that can displace chemicals derived from petroleum or natural gas. In one embodiment, a series of fractionators are used to create a high cetane diesel fuel with an adjustable flash point between 38-54° C. (100-130° F.), a stabilized naphtha (potentially a gasoline blend stock or chemical feedstock), and a light wax ($C_{24}$-$C_{40}$ hydrocarbons). A basic arrangement for these columns includes:

A. Wax Stripper—This unit uses steam to recover fuel-range components from the waxy material. The overhead fuel-range components and steam are sent to the main fractionator while the wax is cooled and stored as a solid. The wax stripper is a column without a condenser or reboiler, operating at approximately 170° C. (340° F.) and with enough pressure, 2.75 barg (40 psig), for the overhead vapors to enter the main fractionator column.

B. Main Fractionator—This column splits the raw fuel into naphtha and diesel range components to control the diesel flash point. This column includes a high pressure (HP) steam heated reboiler and a reflux condenser with 3-phase separation for removing water.

C. Optional naphtha stabilizer to control the Reid vapor pressure (RVP) to a spec of 8 psia. The stabilizer includes a low pressure (LP) steam reboiler and a reflux condenser.

D. Optional diesel cold-flow/kerosene vacuum column to adjust the diesel pour point for cold weather sales and/or produce a kerosene or jet fuel cut. The column includes a high temperature reboiler and a reflux condenser. In one embodiment the high temperature reboiler uses electric heating.

The primary liquid products from the LFP reactor and separation system (Unit 106) are $C_5$-$C_{10}$ hydrocarbons and oxygenated hydrocarbons, stream 12. Stream 13 comprises primarily hydrocarbons with between 10 and 24 carbon atoms.

In an aspect, provided herein is a method for preparing a $CO_2$ stream for use in the production of renewable fuels and chemicals. A contaminated $CO_2$ stream can comprise $CO_2$ and contaminants such as hydrocarbons, oxygenated hydrocarbons, $SO_2$, $H_2S$, COS, $N_2$, amines, or combinations thereof. The contaminated $CO_2$ stream can be fed to adsorbent beds to produce an outlet stream, where the outlet stream of the adsorbent beds has a concentration of $SO_2$, $H_2S$ and COS that is less than 20 parts per billion (ppb), and amine and ammonia concentrations of less than 100 ppb. In some embodiments, the $SO_2$, $H_2S$ and COS have a concentration that is less than 50 parts per million (ppm), 20 ppm, 10 ppm, 1 ppm, 500 ppb, 100 ppb, 50 ppb, 20 ppb, 10 ppb, or 5 ppb. In some embodiments, the amine and ammonia concentrations are less than 50 parts per million (ppm), 20 ppm, 10 ppm, 1 ppm, 500 ppb, 100 ppb, 50 ppb, 20 ppb, 10 ppb, or 5 ppb.

The systems and methods can further include mixing the adsorbent bed outlet stream with a stream comprising oxygen to produce a combustor feed stream and feeding the combustor feed stream to a combustion reactor, where the contaminants are oxidized to produce a combustor product stream.

The molar flow of $O_2$ in the combustor feed stream can be controlled using a sensor that senses an $O_2$ to fuel ratio, such that the mixing of the adsorbent bed outlet stream with the stream comprising oxygen has an equivalence ratio of less than 1.00, less than 0.95, less than 0.9, or less than 0.8. The combustor product stream can have a molar amount of hydrocarbon of less than 10%, less than 8%, less than 5%, less than 3%, or less than 1% of the molar amount of hydrocarbon in the contaminated $CO_2$ stream.

The combustor product stream can be mixed with heated $CO_2$ and $H_2$ streams in which the ratio of $H_2$ and $CO_2$ is between 1.5 and 4.0. In some cases, the ratio of $H_2$ and $CO_2$ is greater than 1.5, greater than 2.0, greater than 2.5, greater than 3, or greater than 3.5. In some instances, the ratio of $H_2$ and $CO_2$ is less than 2.0, less than 2.5, less than 3, less than 3.5, or less than 4.0.

The $H_2$ and $CO_2$ streams can be separately (or combined) and heated to between 900 and 1,250° F. before mixing with the combustor product stream. In some cases, the streams are heated to at least 900, at least 950, at least 975, at least 1,000, at least 1025, at least 1050, at least 1075, at least 1100, at least 1125, at least 1150, at least 1175, or at least 1200° F.

The heated streams can be further heated up to 1,750° F. before introduction into a catalytic reactor which produces a syngas stream that comprises a $H_2$ and CO mixture with a ratio between 1.0 and 4.0. In some instances, the streams are heated to at least 1300, at least 1400, at least 1500, at least 1600, or at least 1700° F. The $H_2$ and CO mixture can have a ratio of greater than 1.0, greater than 1.5, greater than 2.0, greater than 2.5, greater than 3, or greater than 3.5. In some instances, the ratio of $H_2$ and CO is less than 1.5, less than 2.0, less than 2.5, less than 3, less than 3.5, or less than 4.0.

The syngas can be input to a catalytic reactor, that is heated using renewable energy to produce low-carbon fuels and chemicals. The low-carbon fuels and chemicals can have a carbon intensity value that is near zero.

The method provided herein can produce a $CO_2$ stream that comprises at least 90 mol % $CO_2$. In some cases, the carbon dioxide stream is at least 95%, at least 97%, at least 99%, at least 99.5%, at least 99.9%, at least 99.95%, or at least 99.99% $CO_2$.

The method can include providing a source stream comprising hydrocarbons, $CO_2$, and sulfur containing compounds and mixing the source stream with a $H_2$ stream derived from an electrolyzer to produce a low-temperature mixed source stream, where a mass ratio of the $H_2$ stream flowrate to the source stream flowrate is less than 10%, less than 8%, less than 5%, less than 3%, or less than 1%. The method can further include heating the low-temperature mixed source stream in a mixed stream heater that raises the temperature to produce a high-temperature mixed source stream having a temperature of at least 600, at least 700, at least 800, at least 900, or at least 1000° F. The method can further include feeding the high-temperature mixed source stream to a hydrodesulfurization reactor to produce a hydrodesulfurization product stream that comprises $CO_2$ and hydrogen sulfide, and feeding the hydrodesulfurization product stream to a sulfur absorbent reactor to produce an absorbent product stream that comprises carbon dioxide and hydrocarbons, wherein less than ten percent by weight (10 wt. %) of the hydrogen sulfide that was in the hydrodesulfurization product stream remains in the absorbent product stream. In some instances, less than 8 wt. %, less than 5 wt. %, less than 3 wt. %, less than 1 wt. %, less than 0.5 wt. %, less than 0.1 wt. %, or less than 0.05 wt % of the hydrogen sulfide that was in the hydrodesulfurization product stream remains in the absorbent product stream.

The method can further include mixing the sulfur absorbent product stream with an electrolyzer $O_2$ stream to produce a combustion feed stream, feeding the combustion feed stream to a combustion reactor to produce a combustion reactor product stream, wherein hydrocarbons in the combustion feed stream are at least partly combusted to $CO_2$ and $H_2O$, mixing the combustion reactor product stream with a supplemental $H_2$ stream to produce an $O_2$ removal reactor feed stream; and feeding the $O_2$ oxygen removal reactor feed stream to an $O_2$ removal reactor to produce a purified $CO_2$ product stream.

The purified $CO_2$ product stream can be further processed to make low-carbon fuels. At least a portion of the purified carbon dioxide product stream is reacted with a stream comprising hydrogen in a Reverse Water Gas Shift (RWGS) reactor to produce a RWGS product. The electrolyzer $H_2$ stream comprises at least 90 mol %, at least 95 mol %, or at least 99 mol % $H_2$ that is produced from the electrolysis of $H_2O$ in an electrolyzer.

The hydrodesulfurization reactor contains a hydrodesulfurization catalyst that comprises Molybdenum. The sulfur absorbent reactor contains a sulfur absorbent comprising ZnO. The electrolyzer $O_2$ stream comprises $O_2$ that has been produced from the electrolysis of $H_2O$ in an electrolyzer. The purified $CO_2$ product stream has a composition such that it comprises at least 90 wt. % of the $CO_2$ in the source stream but less than 1 wt. % of the sulfur containing compounds and less than 10 wt. % of the hydrocarbons that were in the source stream.

The following are certain embodiment of processes for the conversion of $CO_2$, $H_2O$, and renewable electricity into low or zero carbon high quality fuels and chemicals:

Embodiment 1. Water is fed into an electrolyzer powered by renewable energy. A $CO_2$ stream is prepared for use in the production of renewable fuels and chemicals using a system comprising an adsorbent bed configured to convert a contaminated $CO_2$ stream into an outlet stream. The contaminated $CO_2$ stream comprises $CO_2$ and contaminants, which may include particulates, hydrocarbons, oxygenated hydrocarbons, $SO_2$, $H_2S$, COS, $N_2$, and amines. The outlet stream of the adsorbent beds has a concentration of $SO_2$, $H_2S$ and COS that is less than 20 parts per billion (ppb), and amine and ammonia concentrations of less than 100 ppb, and free of particulates. The electrolyzer is configured to electrolyze $H_2O$ to produce $H_2$ and $O_2$. A combustion reactor is configured to convert a mixture of the adsorbent bed outlet stream and the $O_2$ from the electrolyzer to a combustor product stream, where the contaminants are oxidized in the combustor product stream.

A molar flow of $O_2$ in the combustor feed stream is controlled using a sensor that senses an $O_2$ to fuel ratio, such that the mixing of the absorbent bed outlet stream with the stream comprising $O_2$ has an equivalence ratio of about 0.98, thereby providing a combustor product stream in which a molar amount of hydrocarbon of about 4% of the molar amount of hydrocarbon in the contaminated $CO_2$ stream. The combustor product stream is mixed with heated $CO_2$ and $H_2$ streams in which the ratio of $H_2$ and $CO_2$ is about 2.5. The $H_2$ and $CO_2$ streams are separately heated to about 1,000° F. before mixing with the combustor product stream.

The heated streams are further heated up to about 1,750° F. before introduction into a catalytic reactor which produces a syngas stream that comprises a $H_2$ and CO mixture with a ratio of about 2.0. The syngas is input to a catalytic reactor, that is heated using renewable energy to produce low-carbon fuels and chemicals.

Embodiment 2. A system produces a renewable fuel or chemical. The system comprises an electrolyzer configured to use renewable power to electrolyze $H_2O$ and produce $H_2$ and $O_2$; a conversion module configured to convert the hydrocarbon in a feed stream to additional $CO_2$ using at least a portion of the $O_2$ from the electrolyzer, where the fed stream comprising $CO_2$ and hydrocarbon; and a reactor configured to convert the $CO_2$ in the feed stream and the $H_2$ from the electrolyzer into a renewable fuel or chemical.

The hydrocarbon molecules have less than 8 carbon atoms. The hydrocarbon is converted into $CO_2$ using a thermal oxidation system with the $O_2$ from electrolysis. The thermal oxidation system is oxy-combustion. The concentration of hydrocarbon in the feed stream is about 6 wt. %.

The renewable fuel or chemical is a synthetic diesel fuel. The feed stream is from a $CO_2$ pipeline.

Embodiment 3. A system produces a renewable fuel or chemical. The system comprises an electrolyzer configured to use renewable power to electrolyze $H_2O$ and produce $H_2$ and $O_2$; a conversion module configured to convert the hydrocarbon in a feed stream to additional $CO_2$ using at least a portion of the $O_2$ from the electrolyzer, where the fed stream comprising $CO_2$ and hydrocarbon; and a reactor configured to convert the $CO_2$ in the feed stream and the $H_2$ from the electrolyzer into a renewable fuel or chemical.

The hydrocarbon molecules have less than 8 carbon atoms. The hydrocarbon is converted into $CO_2$ using a catalytic oxidation system. The concentration of hydrocarbon in the feed stream is about 1 wt. %.

The renewable fuel or chemical is a synthetic aviation fuel (SAF). The feed stream is from the manufacturing of cement.

Embodiment 4. A system produces a renewable fuel or chemical. The system comprises an electrolyzer configured to use renewable power to electrolyze $H_2O$ and produce $H_2$ and $O_2$; a conversion module configured to convert the hydrocarbon in a feed stream to additional $CO_2$ using at least a portion of the $O_2$ from the electrolyzer, where the fed stream comprising $CO_2$ and hydrocarbon; and a reactor configured to convert the $CO_2$ in the feed stream and the $H_2$ from the electrolyzer into a renewable fuel or chemical.

The hydrocarbon molecules have less than 8 carbon atoms. The hydrocarbon is converted into $CO_2$ using a catalytic oxidation system. The concentration of hydrocarbon in the feed stream is about 2.5 wt. %.

The renewable fuel or chemical is a mixture of $C_5$-$C_{23}$ hydrocarbons. The feed stream is from petroleum refining.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware or with one or more processors programmed using microcode or software to perform the functions recited above.

In this respect, it should be appreciated that one implementation of the embodiments of the present invention comprises at least one non-transitory computer-readable storage medium (e.g., a computer memory, a portable memory, a compact disk, etc.) encoded with a computer program (i.e., a plurality of instructions), which, when executed on a processor, performs the above-discussed functions of the embodiments of the present invention. The computer-readable storage medium can be transportable such that the program stored thereon can be loaded onto any computer resource to implement the aspects of the present invention discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention.

Various aspects of the present invention may be used alone, in combination, or in a variety of arrangements not specifically discussed in the embodiments described in the foregoing and are therefore not limited in their application to the details and arrangement of components set forth in the foregoing description or illustrated in the drawings. For example, aspects described in one embodiment may be combined in any manner with aspects described in other embodiments.

Also, embodiments of the invention may be implemented as one or more methods, of which an example has been provided. The acts performed as part of the method(s) may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

The invention claimed is:

1. A method for preparing a carbon dioxide stream for use in the production of renewable fuels and chemicals, the method comprising:
   a. providing a contaminated $CO_2$ stream comprising $CO_2$ and contaminants;
   b. feeding the contaminated $CO_2$ stream to adsorbent beds to produce an outlet stream, wherein the outlet stream of the adsorbent beds has a concentration of $SO_2$, $H_2S$ and COS that is less than 20 parts per billion (ppb), and amine and ammonia concentrations of less than 100 ppb;
   c. mixing the adsorbent bed outlet stream with a stream comprising Oz to produce a combustor feed stream; and
   d. feeding the combustor feed stream to a combustion reactor, where the contaminants are oxidized to produce a combustor product stream
wherein one type of contaminant in the contaminated $CO_2$ stream is hydrocarbons, and wherein there is a molar amount of the hydrocarbons in the contaminated $CO_2$ stream, and wherein the molar amount of the hydrocarbons is more than 3 volume percent, and wherein the contaminants are oxidized using a non-catalytic process.

2. The method of claim 1, wherein the $O_2$ is produced from the electrolysis of $H_2O$ using renewable energy.

3. The method according to claim 1, wherein $H_2$ that is produced from the electrolysis of $H_2O$ using renewable energy is used to purify the contaminated $CO_2$ stream.

4. The method of claim 1, wherein a molar flow of $O_2$ in the combustor feed stream is controlled using a sensor that senses an $O_2$ to fuel ratio, such that the mixing of the absorbent bed outlet stream with the stream comprising $O_2$ has an equivalence ratio of less than 1.00, thereby providing a combustor product stream in which a molar amount of hydrocarbon of less than 5% of the molar amount of hydrocarbon in the contaminated $CO_2$ stream.

5. The method of claim 1, wherein the combustor product stream is mixed with heated $CO_2$ and $H_2$ streams in which the ratio of $H_2$ and $CO_2$ is between 1.5 and 4.0.

6. The method of claim 5, wherein the $H_2$ and $CO_2$ streams are separately heated to between 900 and 1,250° F. before mixing with the combustor product stream.

7. The method of claim 6, wherein the heated streams are further heated up to 1,750° F. before introduction into a catalytic reactor which produces a syngas stream that comprises a $H_2$ and CO mixture with a ratio between 1.0 and 4.0.

8. The method of claim 7, wherein the syngas is input to a catalytic reactor, that is heated using renewable energy to produce low-carbon fuels and chemicals.

9. The method of claim 8, wherein the low-carbon fuels and chemicals have a carbon intensity value that is near zero.

10. A method for producing a $CO_2$ stream that comprises at least 90 mol % $CO_2$, the method comprising:
   a. providing a source stream comprising hydrocarbons, $CO_2$, and sulfur containing compounds;
   b. mixing the source stream with an $H_2$ stream derived from an electrolyzer to produce a low-temperature mixed source stream, wherein a mass ratio of the $H_2$ stream flowrate to the source stream flowrate is less than 10%;
   c. heating the low-temperature mixed source stream in a mixed stream heater that raises the temperature to produce a high-temperature mixed source stream having a temperature of at least 600° F.;
   d. feeding the high-temperature mixed source stream to a hydrodesulfurization reactor to produce a hydrodesulfurization product stream that comprises $CO_2$ and hydrogen sulfide;
   e. feeding the hydrodesulfurization product stream to a sulfur absorbent reactor to produce an absorbent product stream that comprises $CO_2$ and hydrocarbons, wherein less than ten percent by weight of the hydrogen sulfide that was in the hydrosulfurization product stream remains in the absorbent stream;
   f. mixing the sulfur absorbent product stream with an electrolyzer $O_2$ stream to produce a combustion feed stream;
   g. feeding the combustion feed stream to a combustion reactor to produce a combustion reactor stream, wherein hydrocarbons in the combustion feed stream are at least partly combusted to $CO_2$ and $H_2O$, and wherein there is a molar amount of the hydrocarbons in the combustion feed stream, and wherein the molar amount of the hydrocarbons is more than 3 volume percent, and wherein the combustion is non-catalytic;
   h. mixing the combustion reactor product stream with a supplemental $H_2$ stream to produce an $O_2$ removal reactor feed stream; and
   i. feeding the oxygen removal reactor feed stream to an $O_2$ removal reactor to produce a purified carbon dioxide product stream.

11. The method of claim 10, wherein the purified $CO_2$ product stream is further processes to make low-carbon fuels.

12. The method of claim 10, wherein at least a portion of the purified $CO_2$ product stream is reacted with a stream comprising $H_2$ in a Reverse Water Gas Shift (RWGS) reactor to produce a RWGS product.

13. The method of claim 10, wherein the electrolyzer $H_2$ stream comprises at least 90 mol % $H_2$ that is produced from the electrolysis of $H_2O$ in an electrolyzer.

14. The method of claim 10, wherein the hydrodesulfurization reactor contains a hydrodesulfurization catalyst that comprises Molybdenum.

15. The method of claim 10, wherein the sulfur adsorbent reactor contains a sulfur adsorbent comprising ZnO.

16. The method of claim 10, wherein the electrolyzer $O_2$ stream comprises Oz that has been produced from the electrolysis of $H_2O$ in electrolyzer.

17. The method of claim 10, wherein the purified product stream has a composition such that it comprises at least 90 wt. % of the $CO_2$ in the source stream but less than 1 wt % of the sulfur containing compounds and less than 10 wt % of the hydrocarbons that were in the source stream.

* * * * *